3,156,688
N-ALKYL AND N-ARALKYL BENZOXA-
CYCLOALKANEMETHYLAMINES
Harold Elmer Zaugg, Lake Forest, Robert William De Net, Waukegan, and Raymond John Michaels, Jr., Mundelein, Ill., assignors to Abbott Laboratories, North Chicago, Ill., a corporation of Illinois
No Drawing. Filed Nov. 5, 1962, Ser. No. 235,510
15 Claims. (Cl. 260—247.7)

The present invention relates to new compounds of the formula

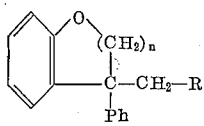

and acid-addition salts thereof as well as to methods for their preparation. In this and succeeding formulas, Ph is phenyl, $n$ is 1, 2 or 3 and R is amino, monoalkylamino, dialkylamino, cycloalkylamino, morpholino, pyrrolidino, benzylamino or 1-methyl-4-piperazino. The term "alkyl" refers to methyl, ethyl, propyl or butyl whereas the term "cycloalkyl" refers to the cyclic radicals containing from 3 to 7 carbon atoms, inclusive. These compounds in their free base form are liquids and can be readily isolated as such or as crystalline solids in the form of their hydrochlorides, hydrobromides, oxalates, benzoates and the like. They are useful as analgesics, antispasmodics, local anesthetics and hypotensive agents and can be employed orally, intravenously or intramuscularly per se or combined with a conventional liquid or solid pharmaceutical carrier to form a tablet, solution, suspension or emulsion. In a typical application, an intravenous injection of an aqueous saline solution of 4-phenyl-4-chromanmethylamine in cats at a dosage of 25 mg. per kg. of body weight produced an immediate, marked drop in blood pressure.

The novel compounds are prepared by refluxing a mixture of lithium aluminum hydride and a compound of the formula

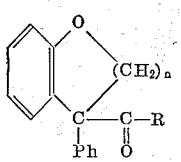

in an inert, organic solvent such as ether. When the reaction is complete, the hydride is decomposed with water and the organic layer is concentrated to obtain the desired product as a liquid residue which if desired can be readily reacted with an organic or inorganic acid in ether to form a solid, acid-addition salt.

The following examples set forth the best mode contemplated by the inventors for practicing their invention but are not to be interpreted as the only embodiments of the same.

EXAMPLE 1

4-Phenyl-4-Chromanmethylamine

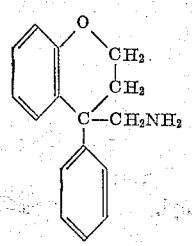

A mixture of 25.3 grams (0.1 mole) of 4-phenyl-4-chromancarboxamide and 9.5 grams (0.25 mole) of lithium aluminum hydride in 600 ml. of ether was refluxed with stirring for 20 hours. The unreacted hydride was then decomposed by the successive dropwise addition of 10 ml. of water, 10 ml. of a 40% aqueous sodium hydroxide solution and 10 ml. of water. Refluxing was thereafter continued for another 2 hours after which the ether solution was decanted and dried over anhydrous magnesium sulfate. After concentrating the dried ether solution to about 250 ml., the 4-phenyl-4-chromanmethylamine contained therein was converted to the hydrochloride by adding excess ethereal hydrogen chloride. The solid salt which precipitated was collected and recrystallized from an ethanol-ether mixture and melted at 231°–232° C. The yield was 66% of theory. N (calculated) = 5.08%; N (found) = 5.12%.

EXAMPLES 2–5

In like manner, the reaction of an R-substituted-4-phenyl-4-chromancarboxamide wherein R is dimethylamino, cyclohexylamino, pyrrolidino or morpholino with excess lithium aluminum hydride and further reaction with hydrogen chloride or oxalic acid results in the formation of the following compounds, respectively:

N,N-dimethyl-4-phenyl-4-chromanmethylamine hydrochloride in a yield of 90% melting at 268°–269° C.;

N-cyclohexy-4-phenyl-4-chromanmethylamine oxalate in a yield of 36% melting at 216°–218° C.;

4-phenyl-4-pyrrolidinomethylchroman hydrochloride in a yield of 77% melting at 260°–262° C. and 4-phenyl-4-morpholinomethylchroman hydrochloride in a yield of 80% melting at 266°–269° C.

Similarly as previously described, the reduction of the carbonyl group with LiAlH$_4$ in an R-substituted-4-phenyl-4-chromancarboxamide wherein R is diethylamino, dipropylamino, dibutylamino, cyclopropylamino, cyclobutylamino, cyclopentylamino, cycloheptylamino, benzylamino, methylamino, ethylamino, propylamino, butylamino or 1-methyl-4-piperazino will produce the corresponding R-substituted-4-phenyl-4-chromanmethylamines.

EXAMPLES 6–11

By substituting an R-2,3-dihydro-3-phenylbenzofuran-3-carboxamide and following the procedure described in Example 1, the following compounds are obtained wherein R in the general formula is as indicated in the table below.

| R | M.P. in °C. of HCl salt | Percent yield | Percent N Calc. | Percent N Found |
|---|---|---|---|---|
| NH$_2$ | 275 | 57 | 5.35 | 5.15 |
| N(CH$_3$)$_2$ | 236 | 52 | 4.83 | 4.83 |
| NH-cyclopropyl | 179 | 12 | 4.65 | 4.77 |
| NH-cyclohexyl | [1] 170 | 36 | 3.53 | 3.65 |
| Morpholino | 234 | 62 | 4.22 | 4.09 |
| 1-methyl-4-piperazino | [2] 254 | 60 | 7.34 | 7.56 |

[1] Oxalate salt.
[2] Dihydrochloride salt.

The reaction of LiAlH$_4$ with other R-substituted-2,3-dihydro-3-phenylbenzofuran-3-carboxamides wherein R is methylamino, ethylamino, propylamino, butylamino, diethylamino, dipropylamino, dibutylamino, cyclobutylamino, cyclopentylamino, cycloheptylamino, pyrrolidino or benzylamino results in the formation of the corresponding R-substituted-2-,3-dihydro-3-phenylbenzofuranmethylamines.

EXAMPLES 12–14

The reaction of a carboxamide of the formula

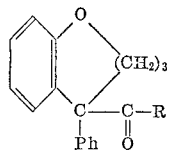

wherein R is amino, dimethylamino or 1-methyl-4-piperazino with lithium aluminum hydride in ether at the reflux temperature will produce compounds of the formula

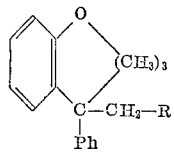

wherein R is as shown in the table below.

| R | M.P. in ° C. of HCl salt | Percent yield | Percent N Calc. | Percent N Found |
|---|---|---|---|---|
| NH$_2$ | 249 | 76 | 4.83 | 4.81 |
| N(CH$_3$)$_2$ | 250 | 65 | 4.40 | 4.28 |
| 1-methyl-4-piperazino | [1] 253 | 95 | 6.55 | 6.41 |

[1] Dihydrochloride monohydrate.

The reduction of other R-substituted-5-phenyl-2,3,4,5-tetrahydro-1-benzoxepin-5-carboxamides with LiAlH$_4$ wherein R is cyclopropylamino, cyclobutylamino, cyclopentylamino, cyclohexylamino, pyrrolidino, morpholino, methylamino, ethylamino, propylamino, butylamino, diethylamino, dipropylamino or dibutylamino will produce the corresponding R-substituted-5-phenyl-2,3,4,5-tetrahydro-1-benzoxepin-5-methylamines.

The carboxamides employed as starting materials in the present invention are known compounds (see Journal of Organic Chemistry 26, 4821 (1961)) or can be prepared by the reaction of a substituted benzofuranone of the formula

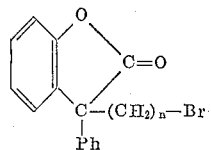

with ammonia, an alkylamine, a dialkylamine, a cycloalkylamine, morpholine, pyrrolidine, benzylamine or 1-methylpiperazine. In carrying out the reaction, one molecular proportion of the benzofuranone and at least two molecular proportions of the amine or ammonia in benzene is allowed to stand at room temperature for 2 to 6 days. The reaction mixture is then filtered, the filtrate is extracted with an aqueous acid solution, the benzene layer is separated, concentrated and the residual oil recrystallized from ethanol to obtain the desired carboxamide as a crystalline solid. The melting points of the carboxamides of the formula

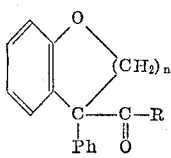

wherein n and R are as indicated in the table below were as follows:

| n | R | M.P. in ° C. |
|---|---|---|
| 1 | n-Propylamino | 112 |
| 1 | Cyclopropylamino | 134 |
| 1 | Cyclobutylamino | 154 |
| 1 | n-Butylamino | 110 |
| 1 | Cyclopentylamino | 171 |
| 1 | Cyclohexylamino | 190 |
| 1 | Cycloheptylamino | 152 |
| 2 | Cyclobutylamino | 141 |
| 2 | Cyclohexylamino | 87 |
| 2 | Benzylamino | 88 |
| 3 | 1-methyl-4-piperazino | 166 |

We claim:
1. A member of the group consisting of a compound of the formula

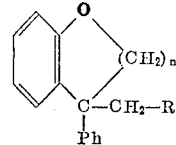

and therapeutically acceptable, acid-addition salts thereof wherein Ph is phenyl, n is a number from 1 to 3 inclusive and R is selected from the group consisting of amino, loweralkylamino, diloweralkylamino, cycloalkylamino, containing from 3 to 7 carbon atoms in the ring, morpholino, pyrrolidino, benzylamino and 1-methyl-4-piperazino.

2. 4-phenyl-4-chromanmethylamine.
3. N,N-dimethyl-4-phenyl-4-chromanmethylamine.
4. N-cyclohexyl-4-phenyl-4-chromanmethylamine.
5. 4-phenyl-4-pyrrolidinomethylchroman.
6. 4-phenyl-4-morpholinomethylchroman.
7. A compound of the formula

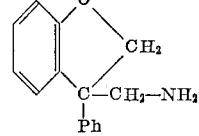

wherein Ph is phenyl.
8. A compound of the formula

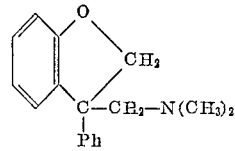

wherein Ph is phenyl.
9. A compound of the formula

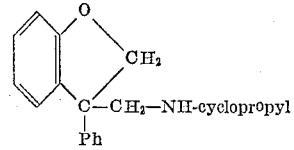

wherein Ph is phenyl.
10. A compound of the formula

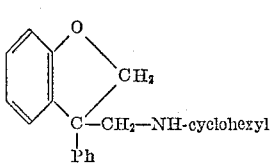

wherein Ph is phenyl.

11. A compound of the formula
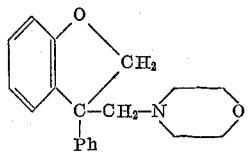
wherein Ph is phenyl.
12. A compound of the formula
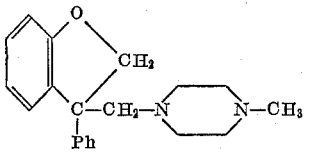
wherein Ph is phenyl.
13. A compound of the formula
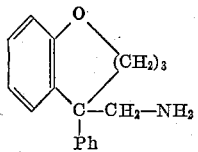
wherein Ph is phenyl.
14. A compound of the formula
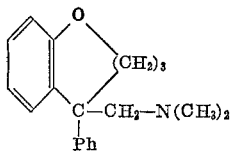
wherein Ph is phenyl.
15. A compound of the formula
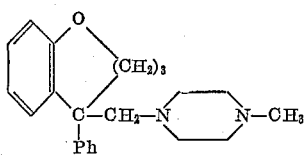
wherein Ph is phenyl.
References Cited in the file of this patent
UNITED STATES PATENTS
| | | |
|---|---|---|
| 2,768,208 | Pederson | Oct. 23, 1956 |
| 3,004,068 | Anderson | Oct. 10, 1961 |